W. J. JOHNSON.
COTTON PRESS.
No. 6,175. Patented Mar. 13, 1849.
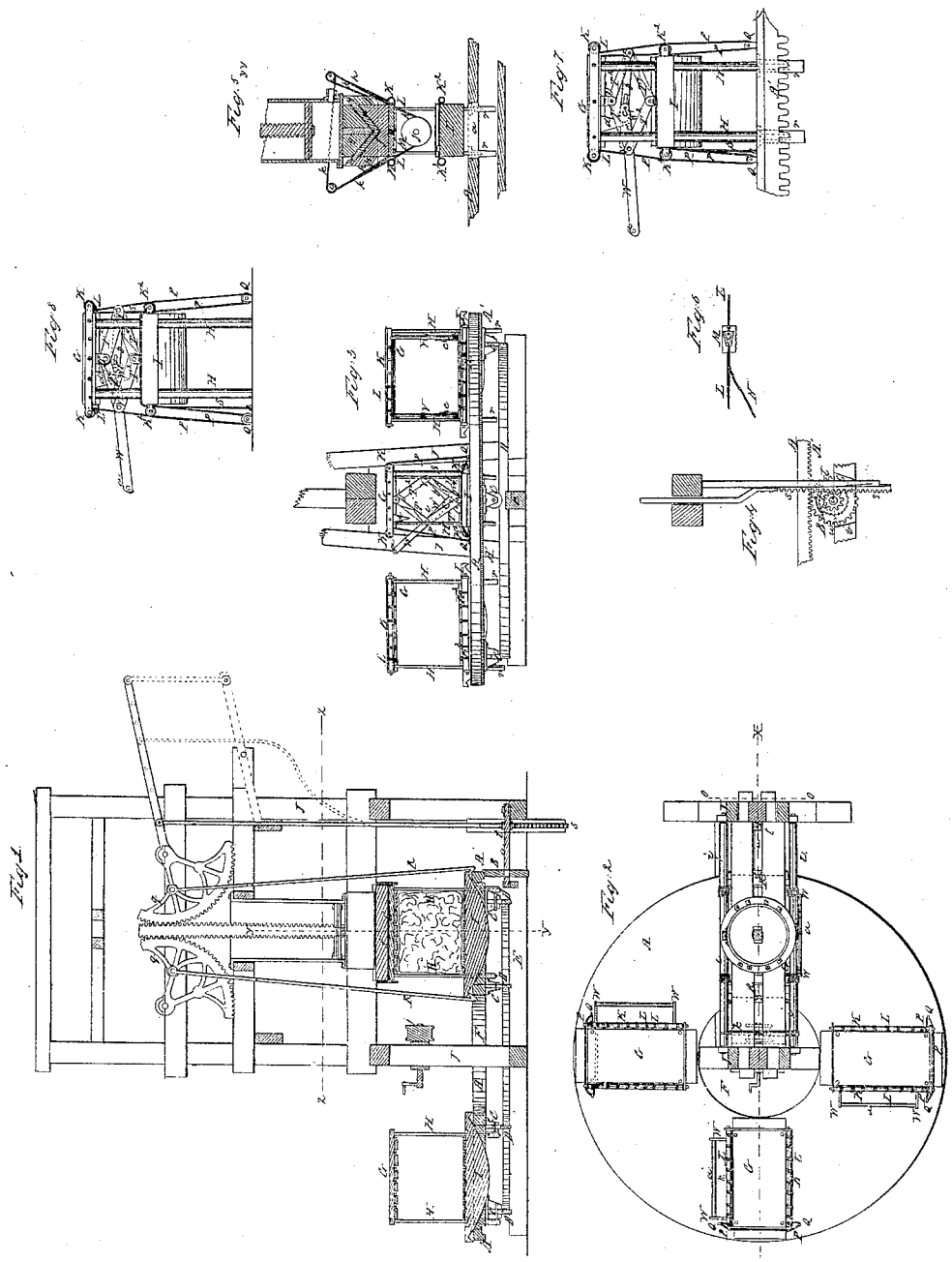

UNITED STATES PATENT OFFICE.

WM. JNO. JOHNSON, OF MOBILE, ALABAMA.

IMPROVEMENT IN COTTON-PRESSES.

Specification forming part of Letters Patent No. 6,175, dated March 13, 1849.

*To all whom it may concern:*

Be it known that I, WILLIAM JOHN JOHNSON, of the city of Mobile, in the county of Mobile and State of Alabama, have invented a new and useful Machine for Compressing Bales of Cotton and other Substances, which is described as follows, reference being had to the annexed drawings of the same, making part of this specification.

Figure 1 is a longitudinal section through $x$ $x$ of Fig. 2, showing a bale of cotton placed between the follower and head-block in readiness to be compressed, the piston of the steam-cylinder being down. Fig. 2 is a horizontal section on the line $z z$ of Fig. 1. Fig. 3 is an elevation of the circular platform and railway and part of the frame. Fig. 4 is a vertical section on the line $o o$ of Fig. 2. Fig. 5 is a vertical section on the line $y y$ of Fig. 1. Fig. 6 is a plan showing one of the rope-conveyers, the ends of the cords wound round the rollers by which it is drawn through the groove and the rope conveyed by it for tying the bale. Fig. 7 represents the position of the arms, lever, and slotted bar when the follower has ascended above half its lift, drawn to a larger scale than the same parts in Fig. 3. Fig. 8 represents the position of the same parts when the follower has ascended the full stroke of the piston.

Similar letters in the several figures refer to corresponding parts.

The end that I desire to accomplish by the combination and arrangement of machinery hereinafter described is to save manual labor in the operation of compressing bales of cotton and other substances for transportation and other purposes. The power that I propose to employ to compress the bales will be steam applied to a reciprocating engine of the ordinary construction, or such as that represented in the annexed drawings, which is now in use, actuating a double-rack piston-rod, cogged sector-levers, connecting-hook rods, and follower for lifting the bale and compressing it against a head-block.

In the ordinary mode of compressing bales of cotton much time is lost, steam expended, and inconvenience experienced in having to stop the operation of the steam-engine while tying the compressed bale in the compressing-machine, and preventing the operation of the machine during the operation of tying said bale. To obviate these difficulties, and to so distribute the labor of the hands that they shall all be employed at the same time while the steam-engine is in operation, I have contrived a combination of machinery to accomplish the desired object, consisting of a revolving platform and a number of combined head-blocks and followers attached to it and other appendages for advancing to the steam-engine a continued supply of bales to be compressed and held in that state by means of jointed rods, levers, slotted arms, and wedges, and for conveying them from the engine to be tied, so that while a hand is having a bale compressed, another hand is having a bale tied, said bale having been previously compressed, secured, and moved round from under the steam-cylinder by the turning of the circular revolving platform in bringing forward another bale, effected simply by the reciprocatory motion of the piston and the machinery connected therewith, which will be particularly described hereinafter.

A is a circular revolving platform having a circular row of cogs, A', affixed to the under side thereof, into which a cog-wheel, B, meshes for turning the platform, the manner of turning and arresting said cog-wheel at successive intervals being described hereinafter.

C are channeled wheels, turning on axles in boxes affixed to the under side of the circular platform, said channels being adapted to the edges of a circular railway, D D, on which said channeled wheels turn. This circular railway should be arranged beneath the circle on which the presses attached to the platform are placed.

E is the foundation of said circular railway.

F is a circular opening in the center of the revolving platform, to admit two of the four posts of the upright stationary frame J, the two opposite posts of said frame being outside the periphery of said revolving platform, mortised and tenoned into parallel sills and connected together by parallel, longitudinal, and transverse timbers.

G H I are four sets of upright sliding pillars, horizontal head-blocks, and followers arranged upon the circular platform equidistant apart. There may be eight or any convenient number to be brought round to the steam-cylinder in succession, but they must be at equal distances apart. A description of one set and its appendages for holding the follower up while tying the bale, and for drawing the ropes through the grooves, will suffice for the rest, as they are all made precisely alike.

H are four pillars for supporting the head-block G. These pillars are reduced in diameter at their lower ends, forming shoulders, which rest upon the platform. The reduced ends work loosely up and down in boxes $r$, secured in the platform. This play of the columns vertically in the boxes is for the purpose of preventing the platform being strained and its level disturbed during the operation of compressing.

I is the follower, made longer than the head-block and the same width, flat on its upper surface and convex on its under surface, which passes through corresponding openings, $a$ $a$, in the platform. Its ends are made of a hook shape to receive the hooks on the ends of the lifting-rods R, connected to the cogged sector-levers $q$. It is bored through with four round holes near its four corners, to admit the four pillars H, that support the head-block G, and over which it slides upward during the operation of compressing, being thus arranged and operated to prevent vibration laterally or longitudinally. The parallel ribs on the under side of the head-block and upper side of the follower are made and arranged in the usual manner.

K K are two rollers turning on gudgeons in plates fixed to the ends of the head-block—one on each side—for winding the cords L, attached to the carriers M, Fig. 6. Placed in the grooves between the parallel ribs on the under side of the head-block, for drawing the said carriers through said grooves, and to which carriers the ropes N are attached for tying the bale in order that they may be drawn through the grooves within reach of the operator simultaneously with the operation of lifting the follower, there are two rollers, $K^2 K^2$, attached to the follower in the same manner. The rollers K K of the head-block are turned by passing a cord, P, Figs. 2 and 3, over the follower and conveying its ends around pulleys Q Q in the platform, and carrying them thence to the said rollers K K of the head-block and attaching them thereto, so that when the follower is raised it carries with it the cord P, which causes the rollers K K to turn, one of them winding the cords L, attached to the conveyers M, and the other roller unwinding them on the opposite side, and at the same time winding another cord, S, Fig. 3, which is attached to the follower, so that as the follower is let down this cord S will be made to draw upon the roller K, causing it to reverse its motion and again wind up the cord, L, to which the conveyers M are attached, and thus draw them (the conveyers) back to their former positions in readiness to receive another set of bale-ropes. The rollers $K^2 K^2$ of the follower I are operated on the same principle and draw the lower set of conveyers with the bale-ropes attached to them through the grooves of the follower, and back again to their former positions after the bale-ropes are detached from them in lowering the follower to receive another bale. The conveyer M is a small rectangular plate having a hole in each end, to which the aforesaid cords L L are attached, and a semi-conical box, $m$, attached to it to receive the end of the bale-rope N, which is knotted at the end and inserted into the conical recess. The knot is inserted at the larger end of the opening and is prevented from passing through the smaller end.

To the under side of the head-block G, and near each end, are attached two arms, $T' T^2$, by a joint-pin, U, which is passed through their ends and a box fastened to the head-block. To the upper side of the follower I, at each end, are attached, by a pin and box, two other arms, $T^3 T^4$, of the same size. These two arms and the two attached to the head-block are connected together at their outer extremities by joint-pins V V, forming a combination of parts resembling a section or link of a "lazy-tongs." The same arrangement of jointed arms are at the opposite ends of the follower and head-block. Two levers, W W, are connected to these combined arms by the joint-pins V aforesaid passing through them, which serve as their fulcra. The long arms of these levers W are connected together by a round bar, $a$. The short arms W' are connected to two slotted arms, $b$, by pins $c$, passing through the slots in said arms. The opposite extremities of the slotted arms $b$ are connected to the central joints, Y, of the four arms on a line with the fulcra of the levers, by the pins V. These levers and slotted arms are for the purpose of holding the jointed arms in their contracted position when the bale is compressed by bringing the levers W and slotted arms $b$ in a straight line, so as to hold the follower I up while removing the press from the steam-engine. The arm $b$ is slotted for the purpose of allowing the connecting-pin $c$ of the lever W to play freely in the slot while contracting and expanding the jointed arms and moving the levers and arms. A triangular plate, $d$, is fastened to the under side of the head-block, with the point directed downward for the purpose of entering between the loose end of the slotted arm $b$ and a shoulder, $e$, formed on the side of the lever W, while being brought to a horizontal line for the purpose of holding them in that position, by which the four jointed arms connected to the head-block and follower are held in a contracted position until the bale be tied. The bale being tied, the operator raises the round connecting-bar $a$, which actuates both levers W and $b$ simultaneously, and thus expands the four arms $T' T^2 T^3 T^4$ and lowers the follower, the triangular plate $d$ remaining stationary.

For the purpose of increasing or diminishing the space in which the several sizes of the bales are to be compressed, in order that they may be subjected to the same degree of pressure from the follower, which always moves the same distance that the piston of the steam-cylinder moves, I arrest the upward motion of the head-block G at any required elevation, according to the size of the bale, by means of an adjustive pendent head-block, $f$, (see Fig. 5,) which is made flat on the under side and concave on the upper side, in the shape of the letter V, corresponding with the shape of the cross-beam $g$ of the frame, which is also made of a V shape on the under side, to fit into said V-shaped cavity of the pendent head-block when the latter is raised to its highest degree of elevation. This adjustive pendent head-block is suspended by four ropes, $h$, to two horizontal rollers, $i$ $i$, one on each side of the frame, whose gudgeons turn in boxes attached to the frame revolved by a windlass, $j$, around which is wound a rope, $k$, attached to and wound around said rollers $i$, so that by turning the windlass to the right or to the left the adjustive head-block $f$ may be raised or lowered to any required elevation. In order to hold the adjustive head-block firmly to its required position when lowered below the V-shaped timber of the frame, two sliding blocks, $n$ $n$, are inserted between the adjustive head-block $f$ and V-shaped timber $g$. These blocks are inserted into grooves in vertical parallel plates $p$, fastened to the frame. These plates $p$ contain a number of parallel grooves for the insertion of other blocks when the adjustive head-block is to be let down to a lower level. The inclination of the grooves in the parallel plates $p$ should be at an angle of about forty-five degrees, and the gravity of the blocks will allow them to descend in the grooves. These blocks must fill the space between the adjustive head-block $f$ and the V-shaped timber $g$, and have a bearing against both.

One of the cogged sector-levers, $q$, is extended beyond its fulcrum, and is connected to a pendent rack, $s$, geared to a pinion, $t$, on a horizontal axle, $u$, of the before-mentioned cog-wheel B, which is geared to the circular rack on the under side of the turning platform aforesaid, for propelling the same at each downward stroke of the piston, for the purpose of bringing forward a bale to be compressed, the length of the rack being graduated to give the pinion the required number of revolutions to produce the intended movement of the platform—say one-fourth of a revolution or one-eighth, according to the number of presses on the platform. As the piston ascends in compressing a bale the rack $s$ descends and turns the pinion $t$ and axle $u$, but does not turn the cog-wheel B, as the ratched wheel $v$, Fig. 4, will turn to the right, its teeth slipping over the tooth $w$ of the pawl fastened to the side of the cog-wheel B; but when the piston descends the rack ascends and turns the pinion $t$ and ratchet $v$ in a contrary direction, and causes the cog-wheel B to turn, which turns the platform a quarter of a revolution, bringing one of the four presses directly under the cylinder. The lifting hook-rods R of the press are then brought below the ends of the follower I. (The piston then ascends and compresses the bale, at the same time bringing the lever $w$ and slotted arm $b$ in contact with the two inclined sides of the triangular plate $d$ on the under side of the head-block G.) The piston again descends, the rack actuating the gearing as before and revolving the platform a quarter of a circle, removing the compressed bale from under the cylinder, and bringing forward another bale to be compressed. When the piston has performed its upward stroke and the follower is as high as it is intended to ascend, and the maximum of pressure is produced on the bale, and the arms $T'$ $T^2$ $T^3$ $T^4$ are in the position represented in Fig. 8, the attendant lays hold of the bar $a$, that connects the outer extremities of the levers W and bears it down. This operation will cause the levers W and arms $b$ to turn on their fulcra V (which are the pins that connect their four arms) and assume the position represented in Fig. 8, causing the shoulders $e$ on the levers W and the ends of the arms $b$ to crowd against the inclined sides of the triangular plate $d$, and to hold the arms $T'$ $T^2$ $T^3$ $T^4$ in their contracted position until the bale be tied, the levers W and slotted arms $b$ serving as braces to hold the follower up by preventing any change in the angle of the four arms. This operation of securing the four jointed arms takes place before the hooks are liberated from the follower upon the descent of the piston. The sides of the triangular holding-plate should incline on either side at a suitable angle corresponding with the variable distances between the shoulder $e$ and extremity of the rod $b$ in pressing different-sized bales, and the levers W and arms $b$ should be made to approximate to right angles with the inclined sides of the plate $d$, so as not to be liable to slip before the bale is secured. The bale being secured, the attendant raises the rod $a$, which causes the levers W and slotted arms $b$ to become disconnected from the triangular plate $d$, and the arms $T'$ $T^2$ $T^3$ $T^4$, to become extended, and the follower I to descend and assume the position represented in Fig. 3.

I do not claim the frame, steam-cylinder, cogged piston-rod, nor cogged eccentric levers for compressing bales of cotton by steam-power; but What I do claim is—

1. The combination and arrangement of the circular revolving platform A and radial presses G H I, for conveying uncompressed bales of cotton or other substances to the steam-cylinder to be compressed simultaneously with the operation of conveying compressed bales from the steam-cylinder to be tied, by which all the hands attending the various parts of the machine are kept constantly employed during the operation of the steam-engine, whether the revolving circular platform be made, arranged, and operated in the manner herein described, or other mode which may be substantially the same.

2. The combination and arrangement of the jointed arms T' T² T³ T⁴, levers W W, slotted arms $b$, and triangular plates $d$, as connected with the follower I, and head-block G, operating in the manner herein set forth, for preventing the descent of the follower I when detached from the lifting-hooks R of the steam-engine before the ropes are tied.

3. The mode of conveying the ropes for tying the bales through the grooves of the head and tail block, by means of the conveyers M, during the operation of compressing a bale simultaneously with the ascent of the follower I, and then returning the conveyers M to their original positions simultaneously with the descent of the said follower I by means of the combination of the conveyers M, rollers K K', and cords attached to the same, arranged and operating in the manner above set forth.

4. The manner of employing the four upright pillars H, with shoulders, in combination with the head-block G, follower I, and circular revolving platform A, said pillars being arranged and operating in the manner described for the purpose of supporting the head-block G in such manner that it can accommodate itself to the position of the pendent head-block $f$ during the operation of compressing without deranging or straining the platform A, said pillars playing loosely in boxes $r$, let into the platform on which the shoulders rest while adjusting the bale for compressing.

In testimony whereof I have hereunto signed my name before two subscribing witnesses.

WILLIAM J. JOHNSON.

Witnesses:
L. WASHINGTON, Sr.,
WM. P. ELLIOT.